(12) United States Patent
Shi et al.

(10) Patent No.: US 12,076,891 B2
(45) Date of Patent: Sep. 3, 2024

(54) PROFILING DEVICE, PROFILING METHOD, BONDING SYSTEM, BONDING METHOD, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Jiafan Shi, Beijing (CN); Liqiang Chen, Beijing (CN); Yaming Wang, Beijing (CN); Dongdong Zhao, Beijing (CN); Chao Zhou, Beijing (CN); Yongchun Jiang, Beijing (CN); Qian Yin, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 156 days.

(21) Appl. No.: 17/682,871

(22) Filed: Feb. 28, 2022

(65) Prior Publication Data

US 2022/0288819 A1 Sep. 15, 2022

(30) Foreign Application Priority Data

Mar. 11, 2021 (CN) .......................... 202110266927.X

(51) Int. Cl.
*B29C 43/02* (2006.01)
*B29C 43/52* (2006.01)
(Continued)

(52) U.S. Cl.
CPC ............ *B29C 43/021* (2013.01); *B29C 43/52* (2013.01); *B29C 65/32* (2013.01);
(Continued)

(58) Field of Classification Search
CPC ....... B29C 43/021; B29C 43/52; B29C 65/32; B29C 65/7814; B29C 2043/3211; B29L 2031/3475
See application file for complete search history.

(56) References Cited

U.S. PATENT DOCUMENTS

2022/0126408 A1 4/2022 Deng et al.
2022/0288911 A1* 9/2022 Mo .......................... B32B 38/10

FOREIGN PATENT DOCUMENTS

CN 108831301 A 11/2018
CN 111415592 A 7/2020
(Continued)

OTHER PUBLICATIONS

Machine translation of CN 111546749 A; Publication date: Aug. 18, 2020; Inventor: Wenwei Mo.*
(Continued)

*Primary Examiner* — Vishal I Patel
(74) *Attorney, Agent, or Firm* — IPro, PLLC

(57) ABSTRACT

A profiling device, a profiling method, a bonding system, a bonding method, and a display device are provided. The profiling device includes a profiling jig. The profiling jig includes an attaching surface. The attaching surface is switchable between a planar state and a profiling state, and the attaching surface is a planar surface in the case that the attaching surface is in the planar state, and the attaching surface is a profiling surface in the case that the attaching surface is in the profiling state.

17 Claims, 12 Drawing Sheets

(51) Int. Cl.
    *B29C 65/32*     (2006.01)
    *B29C 65/78*     (2006.01)
    B29C 43/32     (2006.01)
    B29L 31/34     (2006.01)

(52) U.S. Cl.
    CPC .. *B29C 65/7814* (2013.01); *B29C 2043/3211* (2013.01); *B29L 2031/3475* (2013.01)

(56) References Cited

FOREIGN PATENT DOCUMENTS

| | | | | |
|---|---|---|---|---|
| CN | 111546749 A | * | 8/2020 | ......... B32B 37/1018 |
| CN | 112150932 A | | 12/2020 | |
| CN | 112289189 A | | 1/2021 | |
| CN | 112447097 A | | 3/2021 | |
| JP | 2020120127 A | | 8/2020 | |

OTHER PUBLICATIONS

Machine translation of CN 112289189 A; Publication date: Jan. 29, 2021; Inventor Zhou Qingxu.*
Machine translation of CN 112447097 A; Publication date: Mar. 5, 2021; Inventor: Jia Yu-hu.*
CN202110266927.X second office action.
CN202110266927.X first office action.

* cited by examiner

PROFILING DEVICE, PROFILING METHOD, BONDING SYSTEM, BONDING METHOD, AND DISPLAY DEVICE

CROSS-REFERENCE TO RELATED APPLICATION

This application claims priority to Chinese Patent Application No. 202110266927.X, filed on Mar. 11, 2021 and entitled "PROFILING DEVICE, BONDING DEVICE, BONDING METHOD, AND DISPLAY DEVICE," the disclosure of which is herein incorporated by reference in its entirety.

TECHNICAL FIELD

The present disclosure relates to a profiling device, a profiling method, a bonding system, a bonding method, and a display device.

BACKGROUND

Curved-surface display devices are display devices with curved edge portions. The curved-surface display device typically includes a curved-surface cover plate and a flexible display panel which are bonded to each other. In the process of bonding the flexible display panel to the curved-surface cover plate, the flexible display panel needs to be profiled to curve the edge portion of the flexible display panel.

SUMMARY

Embodiments of the present disclosure provide a profiling device, a profiling method, a bonding system, a bonding method, and a display device.

In a first aspect of the embodiments of the present disclosure, a profiling device is provided. The profiling device includes a profiling jig; wherein the profiling jig includes an attaching surface, wherein the attaching surface is provided with a planar state and a profiling state, the attaching surface is switchable between the planar state and the profiling state, the attaching surface is a planar surface in the case that the attaching surface is in the planar state, and the attaching surface is a profiling surface in the case that the attaching surface is in the profiling state, the profiling surface including a profiling curved-surface.

In some embodiments, a material of the profiling jig includes a shape memory material.

In some embodiments, the shape memory material includes any one of a shape memory alloy and a shape memory polymer.

In some embodiments, the shape memory polymer includes any one of a thermotropic polymer, an electrotropic polymer, a magnetotropic polymer, and a photopolymer.

In some embodiments, the shape memory polymer includes at least one of a cross-linked copolymer of stearyl acrylate and acrylic acid, polyamide, a styrene-butadiene copolymer, and polynorbornene.

In some embodiments, the profiling surface includes a profiling planar surface and the profiling curved-surface, wherein the profiling curved-surface surrounds the profiling planar surface, and the profiling curved-surface continuously extends along an edge of the profiling planar surface, an edge of the profiling curved-surface being smoothly connected to the edge of the profiling planar surface.

In some embodiments, the profiling curved-surface includes a lateral profiling curved-surface and a profiling intersection surface, wherein the lateral profiling curved-surface extends along a side edge of the profiling planar surface, the profiling intersection surface is disposed between adjacent lateral profiling curved-surfaces, and the profiling intersection surface is smoothly connected to the adjacent lateral profiling curved-surfaces.

In some embodiments, the profiling device further includes: an acting jig, wherein the acting jig is configured to control the attaching surface to be switched between the planar state and the profiling state.

In some embodiments, the acting jig includes any one of a heating jig, an electromagnetic jig, and a light-emitting jig.

In some embodiments, the heating jig includes any one of a heat-sensitive heating jig and an inductive heating jig.

In some embodiments, a heating temperature of the heating jig is in a range of 40 to 70° C.

In some embodiments, the profiling device further includes:
a bearing platform, wherein the bearing platform is configured to bear the profiling jig, and a bearing surface of the bearing platform is matable with the profiling surface.

In a second aspect of the embodiments of the present disclosure, a profiling method of a flexible display panel is provided. The method is applicable to a profiling device, wherein the profiling device includes a profiling jig, the profiling jig includes an attaching surface, wherein the attaching surface is switchable between a planar state and a profiling state, the attaching surface is a planar surface in the case that the attaching surface is in the planar state, and the attaching surface is a profiling surface in the case that the attaching surface is in the profiling state, the profiling surface including a profiling curved-surface.

The method includes: attaching the flexible display panel to the attaching surface of the profiling jig in the case that the attaching surface is in the planar state; and controlling the attaching surface of the profiling jig to be switched from the planar state to the profiling state, such that the attaching surface of the profiling jig drives the flexible display panel to be deformed from a planar structure to a curved-surface structure.

In some embodiments, the profiling device further includes an acting jig; and controlling the attaching surface of the profiling jig to be switched from the planar state to the profiling state includes: controlling the attaching surface of the profiling jig to be switched from the planar state to the profiling state by the acting jig.

In some embodiments, a material of the profiling jig includes a thermotropic polymer or an electrotropic polymer, the acting jig is a heating jig, and controlling the attaching surface of the profiling jig to be switched from the planar state to the profiling state includes: heating the profiling jig by the heating jig, such that the attaching surface of the profiling jig is switched from the planar state to the profiling state.

In some embodiments, the material of the profiling jig is a magnetotropic polymer; the acting jig is an electromagnetic jig; and controlling the attaching surface of the profiling jig to be switched from the planar state to the profiling state includes: applying a magnetic field to the profiling jig by the electromagnetic jig, such that the attaching surface of the profiling jig is switched from the planar state to the profiling state.

In some embodiments, the material of the profiling jig is a photopolymer; the acting jig is a light-emitting jig; and controlling the attaching surface of the profiling jig to be switched from the planar state to the profiling state includes: irradiating the profiling jig by the light-emitting jig, such that the attaching surface of the profiling jig is switched from the planar state to the profiling state.

In some embodiments, a back film is attached to a non-display surface of the flexible display panel, wherein the back film includes an adhesion-reducible adhesive layer; and attaching the flexible display panel to the attaching surface of the profiling jig in the planar state includes: attaching the flexible display panel to the attaching surface of the profiling jig by the adhesion-reducible adhesive layer.

In some embodiments, an adhesive strength of the adhesion-reducible adhesive layer before adhesion reduction is not less than 2500 gf/inch.

In some embodiments, a material of the adhesion-reducible adhesive layer includes at least one of an ultraviolet ray photosensitive adhesive, a heat-sensitive adhesive, and a pressure-sensitive adhesive.

In some embodiments, a adhesion-reducible temperature of the heat-sensitive adhesive is greater than 70° C.

In some embodiments, the back film further includes a substrate layer, wherein a material of the substrate layer includes at least one of propylene oxide, thermoplastic polyurethane elastomer rubber, and polyurethane.

In some embodiments, the back film further includes a double-sided adhesive layer, wherein the back film is attached to the non-display surface of the flexible display panel by the double-sided adhesive layer.

In a third aspect of the embodiments of the present disclosure, a bonding system is provided. The bonding system includes a driving jig, a cover plate jig and a profiling device; wherein
  the profiling device includes a profiling jig, wherein the profiling jig includes an attaching surface, wherein the attaching surface is switchable between a planar state and a profiling state, the attaching surface is a planar surface in the case that the attaching surface is in the planar state, and the attaching surface is a profiling surface in the case that the attaching surface is in the profiling state, the profiling surface including a profiling curved-surface;
  the cover plate jig is configured to bear a curved-surface cover plate;
  the profiling jig is configured to bear a flexible display panel;
  the profiling device is configured to profile the flexible display panel, such that a structure of the flexible display panel matches a structure of the curved-surface cover plate; and
  the driving jig is configured to drive the profiling jig and the cover plate jig to approach each other, such that the flexible display panel on the profiling jig is bonded to the curved-surface cover plate on the cover plate jig.

In some embodiments, the profiling device further includes a beating platform, the beating platform is configured to bear the profiling jig; and the driving jig is configured to drive the beating platform to move close to the cover plate jig, such that the profiling jig and the cover plate jig approach each other.

In a fourth aspect of the embodiments of the present disclosure, a bonding method is provided. The bonding method is applicable to the bonding system according to the third aspect or any optional embodiment of the third aspect.

The method includes: disposing a curved-surface cover plate on the cover plate jig; attaching a flexible display panel to the attaching surface of the profiling jig in the planar state; profiling the flexible display panel through the profiling device, such that the structure of the flexible display panel matches the structure of the curved-surface cover plate; and driving, by the driving jig, the profiling jig and the cover plate jig to approach each other, such that the flexible display panel on the profiling jig is bonded to the curved-surface cover plate on the cover plate jig.

In some embodiments, the profiling device further includes a beating platform, wherein the beating platform is configured to bear the profiling jig; driving, by the driving jig, the profiling jig and the cover plate jig to approach each other includes: driving, by the driving jig, the beating platform to move close to the cover plate jig, such that the profiling jig and the cover plate jig approach each other.

In a fifth aspect of the embodiments of the present disclosure, a display device is provided. The display device includes a curved-surface cover plate and a flexible display panel, wherein the curved-surface cover plate and the flexible display panel are bonded to each other by the method according to the fourth aspect or any optional embodiment of the fourth aspect.

In some embodiments, the display device is a curved-surface display device.

DETAILED DESCRIPTION

For clearer descriptions of the technical solutions of the present disclosure, the technical solutions of the present disclosure are introduced below in conjunction with the accompanying drawings. Obviously, the embodiments described below are merely some but not all embodiments of the present disclosure. Based on the embodiments below, all other embodiments derived by a person of ordinary skill in the art without creative efforts should fall within the protection scope of the present disclosure.

Figure 1:
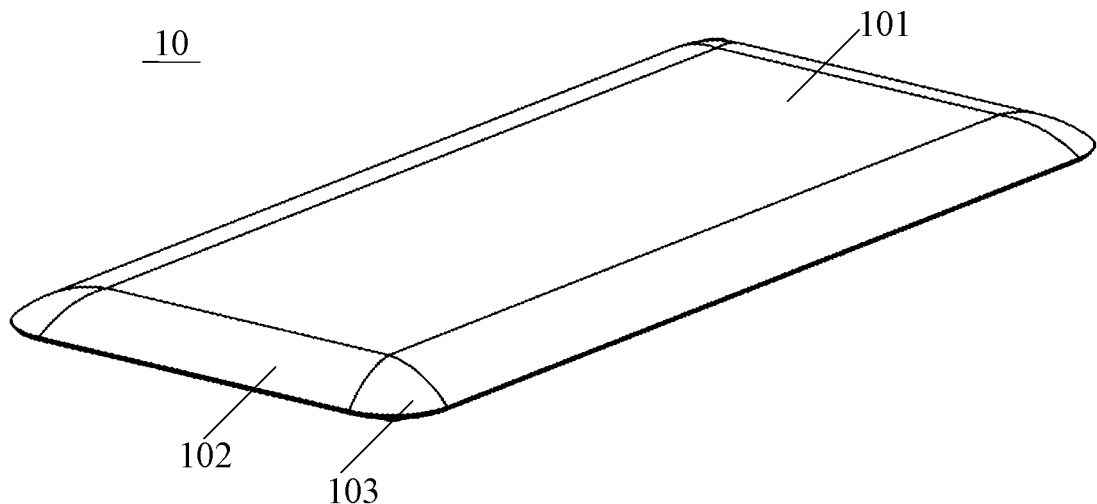
FIG. 1 is a schematic structural diagram of a display device according to an embodiment of the present disclosure.

Curved-surface display devices refer to display devices with curved edge portions. In an exemplary embodiment, FIG. 1 is a schematic structural diagram of a display device 10 according to an embodiment of the present disclosure. The display device 10 is a curved-surface display device. The display device 10 includes a plane portion 101, four curved portions 102 and four intersection portions 103. The plane portion 101 is a rectangular plate-shaped structure, wherein the plane portion 101 includes two opposite plate surfaces and four side surfaces which are intersected with the two plate surfaces respectively. The four curved portions 102 are disposed along the four side surfaces of the plane portion 101 in one-to-one correspondence, wherein each of the curved portions 102 is smoothly transitioned and connected to the plane portion 101. One intersection portion 103 is disposed between each two adjacent curved portions 102, and each of the intersection portions 103 is smoothly transitioned and connected to the curved portions 101 adjacent to the intersection portion 103. That is, the intersection portion 103 is configured to connect adjacent curved portions 102, and the intersection portions 103 are disposed in an intersection region of the adjacent curved portions 102, and the four intersection portions 103 are in one-to-one correspondence with four corners of the plane portion 101.

The curved-surface display device includes a flexible display panel and a curved-surface cover plate which are bonded to each other. In the curved-surface display device, a display surface of the flexible display panel and an inner surface of the curved-surface cover plate have an identical curved-surface structure. Referring to FIG. 1, that is, each of the curved-surface cover plate and the flexible display panel includes structures corresponding to the plane portion 101, the curved portions 102, and the intersection portions 103 respectively.

Figure 2:
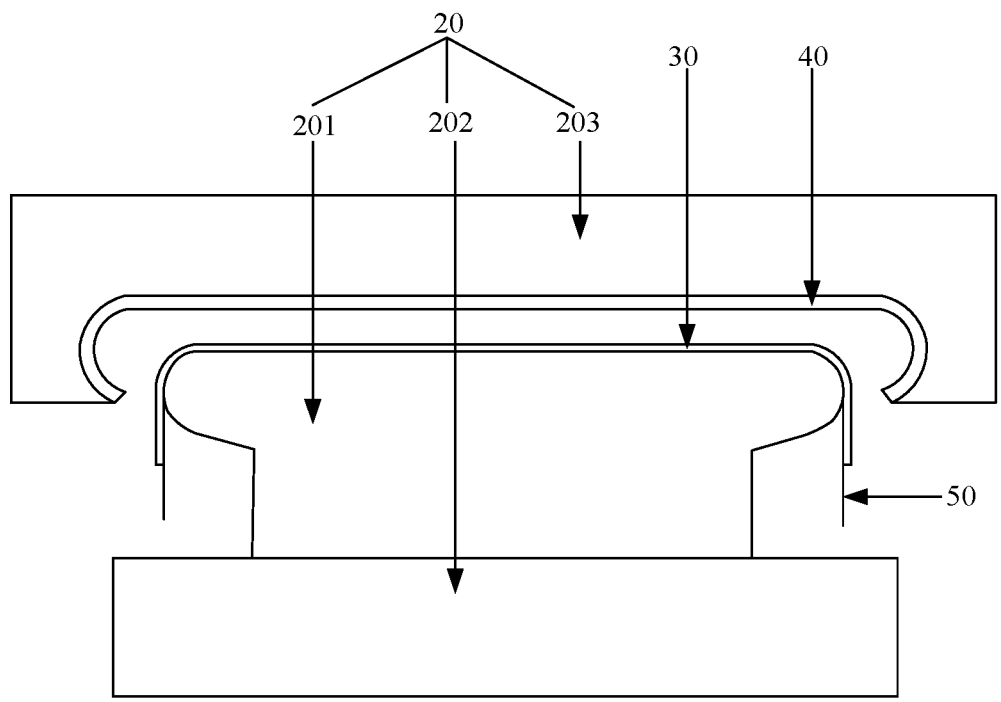
FIG. 2 is a schematic structural diagram of a bonging device in the related art.

Usually, the flexible display panel may be bonded to the curved-surface cover plate by a bonding device. In an exemplary embodiment, FIG. 2 is a structural schematic diagram of a bonding device 20 in the related art. The bonding device 20 includes a profiling jig 201, a driving jig 202 and a cover plate jig 203. The material of the profiling jig 201 is silicone. The profiling jig 201 is disposed on the driving jig 202. A surface, distal from the driving jig 202, of the profiling jig 201 is a profiling surface of the profiling jig 201, wherein the profiling surface is configured to bear the flexible display panel and to profile the flexible display panel. The driving jig 202 is configured to drive the profiling jig 201 to move. The cover plate jig 203 is configured to bear the curved-surface cover plate.

During bonding the flexible display panel 30 to the curved-surface cover plate 40 by the bonding device 20, a carrier film 50 is firstly attached to a non-display surface of the flexible display panel 30. Then the flexible display panel 30, to which the carrier film 50 is bonded, is disposed on the profiling surface of the profiling jig 201, such that a display surface of the flexible display panel 30 is disposed on a side, distal from the profiling jig 201, of the carrier film 40. The profiling jig 201 profiles the flexible display panel 30, such that an edge portion of the flexible display panel 30 is curved and adapted to the profiling surface in shape. Afterward, the curved-surface cover plate 40 is disposed on a bearing surface of the cover plate jig 203 (i.e., an inner surface of the cover plate jig 203), such that the inner surface of the curved-surface cover plate 40 is distal from the cover plate jig 203, and the curved-surface cover plate 40 is opposite to the flexible display panel 30. Finally, in a vacuum environment, the profiling jig 201 is driven by the driving jig 202 to move towards the cover plate jig 203, such that the display surface of the flexible display panel 30 is bonded to the inner surface of the curved-surface cover plate 40.

During bonding the flexible display panel 30 to the curved-surface cover plate 40 by the bonding device 20, the flexible display panel 30 needs to be disposed on the profiling jig 201 for profiling firstly, such that the flexible display panel 30 is deformed from a planar structure to a three-dimensional structure. However, the area of an intersection region of the flexible display panel 30 (which refers to a region in the flexible display panel 30 corresponding to the intersection portion 103 shown in FIG. 1) before profiling is not equal to the area of the intersection region after profiling, which easily causes that the intersection region of the flexible display panel 30 cannot be fully profiled, then causes the intersection region of the flexible display panel 30 cannot be in snugly engaged with the profile jig 201 during attaching the flexible display panel 30 to the curved-surface cover plate 40. As a result, wrinkles, bubbles and other bonding defects appear and the problems such as circuit breakage in the flexible display panel 30 are easily caused, affecting the normal display of the curved-surface display device.

A profiling device is provided in embodiments of the present disclosure. The profiling device includes a profiling jig. The profiling jig includes an attaching surface. The attaching surface is provided with a planar state and a profiling state, wherein the attaching surface is switchable between the planar state and the profiling state, the attaching surface is a planar surface in the case that the attaching surface is in the planar state, and the attaching surface is a profiling surface in the case that the attaching surface is in the profiling state. The profiling surface includes a profiling curved-surface. In the case that a flexible display panel is profiled by this profiling device, firstly the attaching surface of the profiling device is controlled to be in the planar state, then the flexible display panel is attached to the attaching surface and afterward, the attaching surface is controlled to be switched from the planar state to the profiling state. During the attaching surface is switched from the planar state to the profiling state, the attaching surface drives the flexible display panel to be deformed, such that the flexible display panel is deformed a planar structure to a three-dimensional structure to achieve the profiling of the flexible display panel. Since the profiling of the flexible display panel is achieved by driving the flexible display panel to be deformed by deformation of the attaching surface of the profiling jig, an intersection region of the flexible display panel may be fully profiled to avoid the problems such as wrinkles, bubbles, and circuit breakage in the case that the flexible display panel is bonded to the curved-surface cover plate, thereby improving the bonding effect, increasing the bonding yield and improving the reliability.

In an exemplary embodiment, the profiling jig is provided with a first state and a second state, the profiling jig is switchable between the first state and the second state. The attaching surface of the profiling jig is in the planar state in the case that the profiling jig is in the first state, and the attaching surface of the profiling jig is in the profiling state in the case that the profiling jig is in the second state. The material of the profiling jig may be a shape memory material, and the profiling jig may memorize the structure of the profiling jig in the first state and the structure of the profiling jig in the second state. In the case that the flexible display panel is profiled by the profiling device, firstly the profiling jig is controlled to be in the first state, such that the attaching surface of the profiling jig is in the planar state; then the flexible display panel is attached to the attaching surface of the profiling jig; afterward, the profiling jig is controlled to be switched from the first state to the second state, such that the attaching surface of the profiling jig is switched from the planar state to the profiling state. During the process that the profiling jig is switched from the first state to the second state, the attaching surface of the profiling jig drives the flexible display panel to be deformed, such that the flexible display panel is deformed from the planar structure to the three-dimensional structure to achieve the designed profiling effect. As a force is applied comprehensively and a force application direction is accurate in the case that the shape memory material restores itself, the profiling device may fully profile the intersection region of the flexible display panel, thereby avoiding the problems such as wrinkles, bubbles, and circuit breakage in the case that attaching the flexible display panel to the curved-surface cover plate.

Embodiments of the present disclosure are introduced below. An embodiment of the profiling device is introduced firstly.

Figure 3:
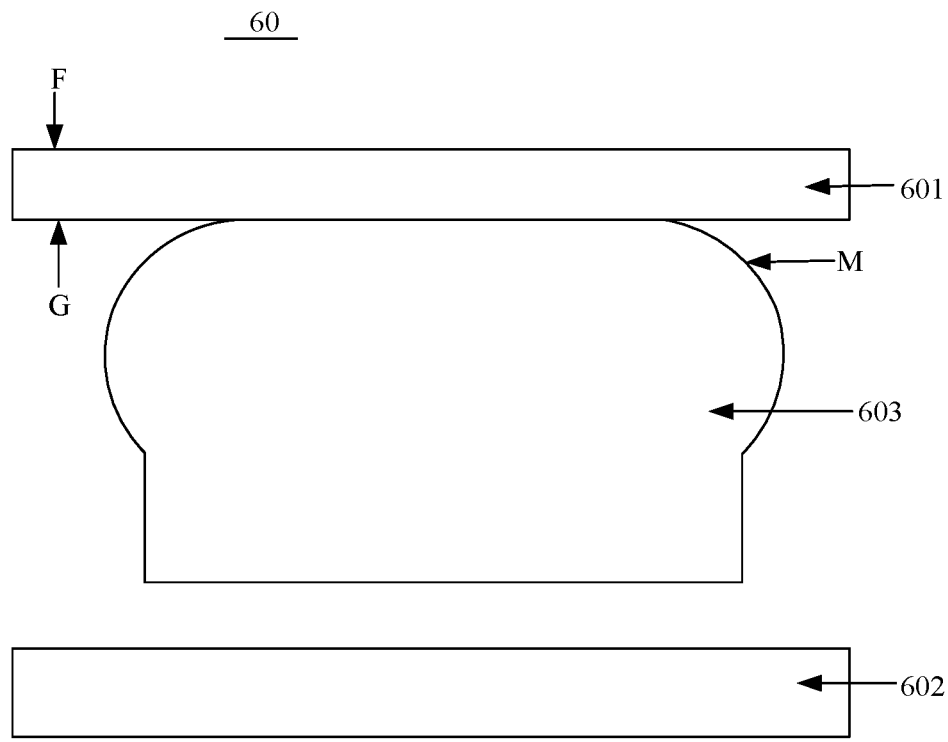
FIG. 3 is a schematic structural diagram of a profiling device according to an embodiment of the present disclosure.
Figure 4:
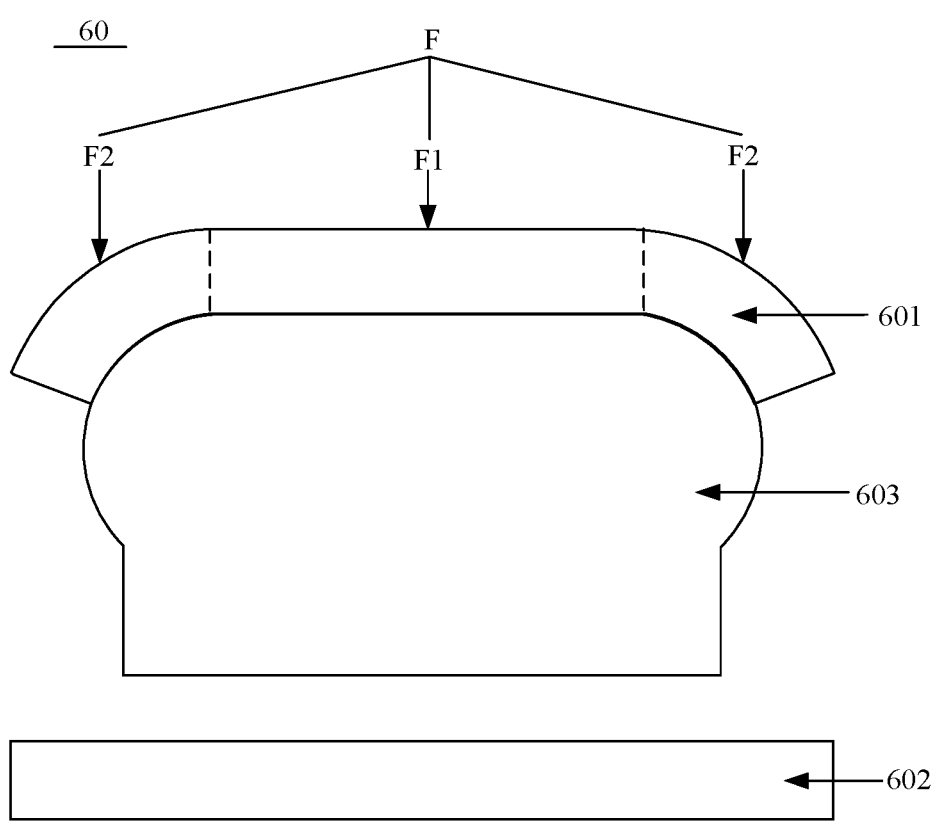
FIG. 4 is a schematic structural diagram of another profiling device according to an embodiment of the present disclosure.

FIG. 3 is a schematic structural diagram of a profiling device 60 according to an embodiment of the present disclosure. FIG. 4 is a schematic structural diagram of another profiling device 60 according to an embodiment of the present disclosure. The profiling device 60 includes a profiling jig 601. The profiling jig 601 includes an attaching surface F. The attaching surface F is provided with a planar state and a profiling state, the attaching surface F is switchable between the planar state and the profiling state. The attaching surface F is a planar surface in the case that the attaching surface F is in the planar state, and the attaching surface F is a profiling surface in the case that the attaching surface F is in the profiling state. The profiling surface includes a profiling curved-surface. FIG. 3 shows a schematic diagram in the case that the attaching surface F is in the planar state, and FIG. 4 shows a schematic diagram in the case that the attaching surface F is in the profiling state.

In some embodiments, the profiling jig 601 is provided with a first state and a second state, the profiling jig 601 is switchable between the first state and the second state. The attaching surface F of the profiling jig 601 is in the planar state in the case that the profiling jig 601 is in the first state. The attaching surface F of the profiling jig 601 is in the profiling state in the case that the profiling jig 601 is in the second state. FIG. 3 may be a schematic diagram in the case that the profiling jig 601 is in the first state and FIG. 4 may be a schematic diagram in the case that the profiling jig 601 is in the second state.

In some embodiments, the material of the profiling jig 601 includes a shape memory material. That is, the profiling jig 601 may be made of the shape memory material. The shape memory material refers to a material achieving a shape memory effect (SME). The shape memory material may be deformed within limits under some conditions. After the shape memory material is deformed, in the case that an appropriate condition is applied to the shape memory material, the deformation of the shape memory material will disappear and the shape memory material returns to the shape before the deformation. Since the material of the profiling jig 601 is the shape memory material, the profiling jig 601 is switchable between the first state and the second state.

In some embodiments, the material of the profiling jig 601 includes any one of a shape memory alloy and a shape memory polymer. The shape memory polymer may include any one of a thermotropic polymer, an electrotropic polymer, a magnetotropic polymer, and a photopolymer. In some embodiments, the shape memory polymer includes a combination of one or more of a cross-linked copolymer of stearyl acrylate (SA) and acrylic acid (AA), polyamide, a styrene-butadiene copolymer, and polynorbornene. Under the temperature condition of in the range of 40 to 70° C., a magnetic induction condition or light irradiation, molecules of the shape memory polymer may undergo a phase change and undergo structural reorganization, thereby causing a shape change.

In some embodiments, the thickness of the profiling jig 601 is 1 mm to 3 mm, which may facilitate the deformation of the profiling jig 601. The thickness direction of the profiling jig 601 is perpendicular to the attaching surface F in the planar state.

In some embodiments, as shown in FIG. 3 and FIG. 4, the profiling device 60 further includes an acting jig 602. The acting jig 602 is configured to control the attaching surface F of the profiling jig 601 to be switched between the planar state and the profiling state. In some embodiments, the acting jig 602 is configured to control the profiling jig 601 to be switched between the first state and the second state, such that the attaching surface F of the profiling jig 601 is switched between the planar state and the profiling state.

Depending on the different materials of the profiling jig 601, the acting jig 602 may include any one of a heating jig, an electromagnetic jig, and a light-emitting jig. The heating temperature of the heating jig may be in a range of 40 to 70° C., and the heating jig may include any one of a heat-sensitive heating jig and an inductive heating jig.

In one embodiment, the material of the profiling jig 601 is the thermotropic polymer, and the acting jig 602 is the heat-sensitive heating jig. The acting jig 602 may generate heat under thermal induction to heat the profiling jig 601, such that the profiling jig 601 is switched between the first state and the second state.

In another embodiment, the material of the profiling jig 601 is the electrotropic polymer, and the acting jig 602 is the inductive heating jig. The acting jig 602 may generate heat under electrical induction to heat the profiling jig 601, such that the profiling jig 601 is switched between the first state and the second state.

In still another embodiment, the material of the profiling jig 601 is the magnetotropic polymer, and the acting jig 602 is the electromagnetic jig. The acting jig 602 may apply an electromagnetic field to the profiling jig 601, such that the profiling jig 601 is switched between the first state and the second state.

In yet still another embodiment, the material of the profiling jig 601 is the photopolymer, and the acting jig 602 is the light-emitting jig. The acting jig 602 may emit light and irradiate the profiling jig 601 to apply light energy to the profiling jig 601, such that the profiling jig 601 is switched between the first state and the second state.

The description is given by taking the material of the profiling jig 601 being the shape memory polymer as an example above. In the case that the material of the profiling jig 601 is the shape memory alloy, the acting jig 602 may be a jig that may be deformed the shape memory alloy. In addition, the profiling jig 601 and the acting jig 602 may be an integrated jig with a fixed relative position, or two independent jigs. In FIGS. 3 and 4, the description is given by taking that the profiling jig 601 and the acting jig 602 are two independent jigs as an example.

In some embodiments, as shown in FIGS. 3 and 4, the profiling device 60 further includes a bearing platform 603. The bearing platform 603 is configured to bear the profiling jig 601, and a bearing surface M of the bearing platform 603 may matable with the profiling surface (i.e., the attaching surface F in the profiling state) of the profiling jig 601. In some embodiments, the profiling jig 601 is provided with the attaching surface F and a setting surface G which are opposite to each other. The profiling jig 601 may be disposed on the bearing surface M of the bearing platform 603 through the setting surface G, and in the case that the attaching surface F of the profiling jig 601 is in the profiling state, the setting surface G of the profiling jig 601 may matable with the bearing surface M of the bearing platform 603. That is, the setting surface G of the profiling jig 601 may be snugly engaged with the bearing surface M of the bearing platform 603.

In some embodiments, the profiling jig 601 is attached to the bearing platform 603, or the profiling jig 601 is detachably mounted to the bearing platform 603 by a detachable clamp, a threaded connecting piece, and the like.

Figure 5:
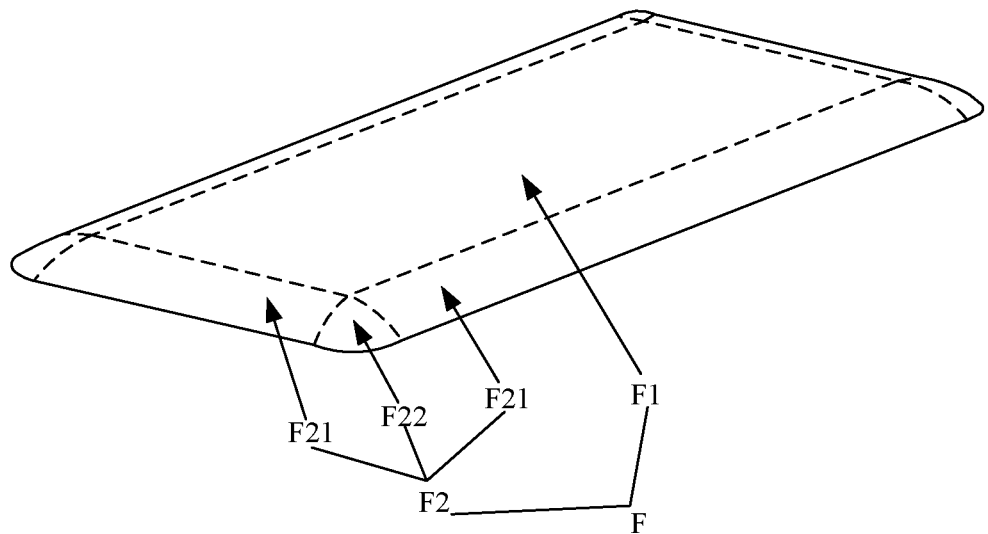
FIG. 5 is a schematic structural diagram of a profiling surface according to an embodiment of the present disclosure.

In some embodiments, FIG. 5 is a schematic structural diagram of a profiling surface (i.e., the attaching surface F in the profiling state) according to an embodiment of the present disclosure. Referring to FIGS. 4 and 5, the profiling surface F includes a profiling planar surface F1 and a profiling curved-surface F2. The profiling curved-surface F2 surrounds the profiling planar surface F1, and the profiling curved-surface F2 continuously extends along an edge of the profiling planar surface F1. An edge of the profiling curved-surface F2 is smoothly connected to the edge of the profiling planar surface F1. The profiling planar surface F1 and the profiling curved-surface F2 may be the same surface. The profiling curved-surface F2 may include a lateral profiling curved-surface F21 and a profiling intersection surface F22. The lateral profiling curved-surface F21 extends along a side edge of the profiling planar surface F1, and the profiling intersection surface F22 is disposed between adjacent lateral profiling curved-surfaces F21. The profiling intersection surface F22 is smoothly connected to the adjacent lateral profiling curved-surfaces F21. The lateral profiling curved-surfaces F21 and the profiling intersection surfaces F22 may be the same surface.

In FIG. 5, the description is given by taking the profiling planar surface F1 being a rectangular planar surface as an example. The profiling curved-surface F2 includes four lateral profiling curved-surfaces F21 and four profiling intersection surfaces F22. The four lateral profiling curved-surfaces F21 extend along the four side edges of the profiling planar surface F1 in one-to-one correspondence and the four profiling intersection surfaces F22 are disposed at four corners of the profiling planar surface F1 in one-to-one correspondence. The shape of the profiling planar surface may be disposed according to actual conditions, and the structure of the profiling curved-surface may adapt to the shape of the profiling planar surface. In some embodiments, the shape of the profiling planar surface may be triangular, pentagonal, hexagonal, circular, etc., and the structure of the profiling curved-surface adapts to the shape of the profiling planar surface. In some embodiments, the profiling planar surface is triangular and the profiling curved-surface includes three lateral profiling curved-surfaces and three profiling intersection surfaces. The three lateral profiling curved-surfaces extend along three side edges of the profiling planar surface in one-to-one correspondence. The three profiling intersection surfaces are disclosed at three corners of the profiling planar surface in one-to-one correspondence. In some embodiments, the profiling planar surface is pentagonal and the profiling curved-surface includes five lateral profiling curved-surfaces and five profiling intersection surfaces. The five lateral profiling curved-surfaces extend along five side edges of the profiling planar surface in one-to-one correspondence. The five profiling intersection surfaces are disclosed at five corners of the profiling planar surface in one-to-one correspondence.

The profiling device 60 according to the embodiment of the present disclosure may be configured to profile the flexible display panel. In the case that the attaching surface F of the profiling jig 601 is in the profiling state, the structure of the attaching surface F (i.e., the structure of the profiling surface) may correspond to a target structure (such as a three-dimensional structure) of the flexible display panel. In an exemplary embodiment, in the case that the attaching surface F of the profiling jig 601 is in the planar state, the flexible display panel is attached to the attaching surface F of the profiling jig 601, and then the attaching surface F of the profiling jig 601 is controlled to be switched from the planar state to the profiling state. During this process, the attaching surface of the profiling jig 601 drives the flexible display panel to be deformed, such that the flexible display panel is deformed from the planar structure to the target structure to realize the profiling of the flexible display panel.

Since the flexible display panel is attached to the attaching surface F in the case that the attaching surface F of the profiling jig 601 is in the planar state, the operation of attaching the flexible display panel to the attaching surface F is simple and the attaching yield is higher. Since the deformation of the attaching surface F of the profiling jig 601 drives the flexible display panel to be deformed to profile the flexible display panel, the profiling accuracy of the flexible display panel is higher and the intersection region of the flexible display panel (i.e., a region on the flexible display panel corresponding to the profiling intersection surface F22) may be fully profiled to avoid the problems such as wrinkles, bubbles, and circuit breakage in the case that the flexible display panel is bonded to the curved-surface cover plate, thereby improving the bonding effect, increasing the bonding yield and improving the reliability.

The above is the introduction to the profiling device of the present disclosure, and the profiling device may be configured to profile the flexible display panel. The following introduces a profiling method of the present disclosure by taking the profiling of the flexible display panel as an example.

Figure 6:
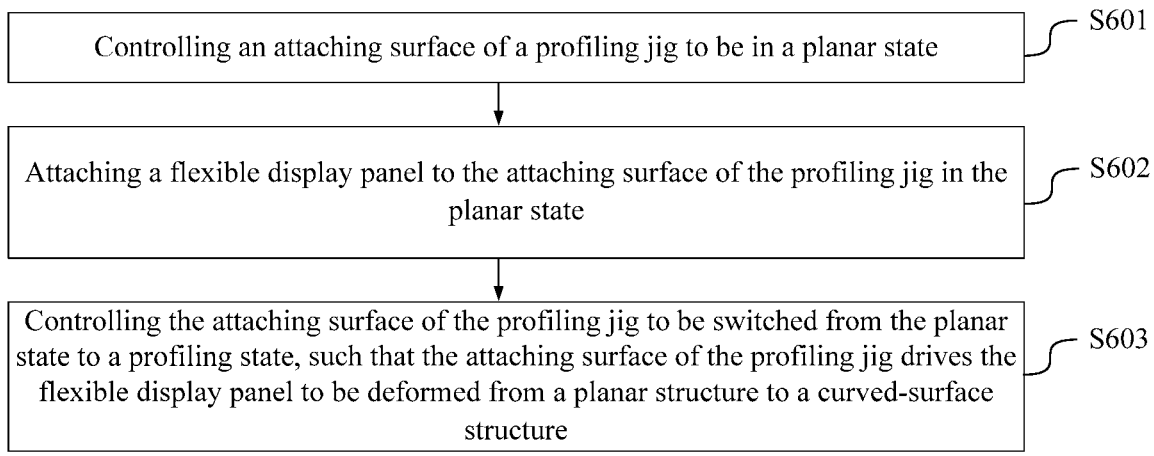
FIG. 6 is a flowchart of a profiling method of a flexible display panel according to an embodiment of the present disclosure.

FIG. 6 is a flowchart of a profiling method of a flexible display panel according to an embodiment of the present disclosure. This profiling method is applicable to the profiling device 60 described above. The profiling device 60 includes a profiling jig 601, and an attaching surface F of the profiling jig 601 may be switched between a planar state and a profiling state. The method includes:

In S601, the attaching surface of the profiling jig is controlled to be in the planar state.

In some embodiments, the profiling device 60 further includes an acting jig 602, and the attaching surface F of the profiling jig 601 is controlled to be in the planar state by the acting jig 602. In some embodiments, the profiling jig 601 is controlled to be in a first state by the acting jig 602, such that the attaching surface F of the profiling jig 601 is in the planar state.

In embodiments of the present disclosure, the material of the profiling jig 601 may include any one of a thermotropic polymer, an electrotropic polymer, a magnetotropic polymer, and a photopolymer. The acting jig 602 may include any one of a heat-sensitive heating jig, an inductive heating jig, an electromagnetic jig, and a light-emitting jig.

In one embodiment, the material of the profiling jig 601 is the thermotropic polymer, and the acting jig 602 is the heat-sensitive heating jig. The profiling jig 601 may be heated by the heat-sensitive heating jig, such that the profiling jig 601 is in the first state after deformation and thus the attaching surface F of the profiling jig 601 is in the planar state.

In another embodiment, the material of the profiling jig 601 is the electrotropic polymer, and the acting jig 602 is the inductive heating jig. The profiling jig 601 may be heated by the inductive heating jig, such that the profiling jig 601 is in the first state after deformation and thus the attaching surface F of the profiling jig 601 is in the planar state.

In still another embodiment, the material of the profiling jig 601 is the magnetotropic polymer, and the acting jig 602 is the electromagnetic jig. A magnetic field may be applied to the profiling jig 601 by the electromagnetic jig, such that the profiling jig 601 is in the first state after deformation and thus the attaching surface F of the profiling jig 601 is in the planar state.

In yet still another embodiment, the material of the profiling jig 601 is the photopolymer, and the acting jig 602 is the light-emitting jig. The profiling jig 601 may be irradiated by the light-emitting jig, such that the profiling jig 601 is in the first state after deformation and thus the attaching surface F of the profiling jig 601 is in the planar state.

In the case that the profiling jig 601 is in the first state, some processing may be performed on the profiling jig 601, such that the profiling jig 601 may maintain the first state. In some embodiments, after the profiling jig 601 is in the first state by heating, the profiling jig 601 may be cooled at the room temperature, such that the profiling jig 601 may maintain the first state.

In S602, the flexible display panel is attached to the attaching surface of the profiling jig in the planar state.

The flexible display panel may include a display surface and a non-display surface which are opposite to each other. The non-display surface of the flexible display panel may be attached to the attaching surface F of the profiling jig 601 in the planar state, thereby attaching the flexible display panel to the attaching surface F of the profiling jig 601 in the planar state.

Figure 7:
FIG. 7 is a schematic diagram of attaching a flexible display panel to a profiling jig according to an embodiment of the present disclosure.

In some embodiments, as shown in FIG. 7, a back film 80 is attached to the non-display surface of the flexible display panel 70. The back film 80 includes an adhesion-reducible adhesive layer 801. The flexible display panel 70 may be attached to the attaching surface F of the profiling jig 601 in the planar state by the adhesion-reducible adhesive layer 801. The material of the adhesion-reducible adhesive layer 801 may include at least one of an ultraviolet ray (UV) photosensitive adhesive, a heat-sensitive adhesive, and a pressure-sensitive adhesive. The adhesion of the UV photosensitive adhesive may be reduced by ultraviolet light irradiation. The adhesion of the pressure-sensitive adhesive may be reduced by changing the pressure. The adhesion of the heat-sensitive adhesives may be reduced by heating. The adhesion-reducible temperature of the heat-sensitive adhesive is usually greater than 70° C., that is, the adhesion-reducible temperature of the adhesion-reducible adhesive layer 801 made of the heat-sensitive adhesive is greater than 70° C.

In some embodiments, an adhesive strength of the adhesion-reducible adhesive layer 801 before adhesion reduction is not less than 2500 gf/inch, which may ensure the reliable connection between the profiling jig 601 and the flexible display panel 70. During profiling the flexible display panel 70 by the profiling jig 601, the profiling jig 601 may drive the flexible display panel 70 to be deformed by the back film 80 so as to achieve the profiling of the flexible display panel 70. The adhesive strength of the adhesion-reducible adhesive layer 801 after adhesion reduction is not greater than 2500 gf/inch. The adhesive strength after adhesion reduction is 0 (that is, the adhesion-reducible adhesive layer 801 after the adhesion reduction loses its adhesion), which may facilitate separating the flexible display panel 70 from the profiling jig 601.

In some embodiments, the back film 80 further includes a substrate layer 802. The substrate layer 802 may be a flexible substrate layer. The thickness of the substrate layer 802 may be about 80 μm, and the degree of fracture strain of the substrate layer 802 may be greater than 100%. The material of the substrate layer 802 may include at least one of propylene oxide, thermoplastic polyurethane elastomer rubber, and polyurethane. The above materials possess good stretchability, may drive the flexible display panel 70 to be deformed, and may improve the poor profiling caused by the excessively hard back film. The back film 80 may further include a double-sided adhesive layer 803. The double-sided adhesive layer 803 and the adhesion-reducible adhesive layer 801 are disposed on two sides of the substrate layer 802 respectively. The back film 80 is attached to the non-display surface of the flexible display panel 70 by the double-sided adhesive layer 803.

Figure 8:
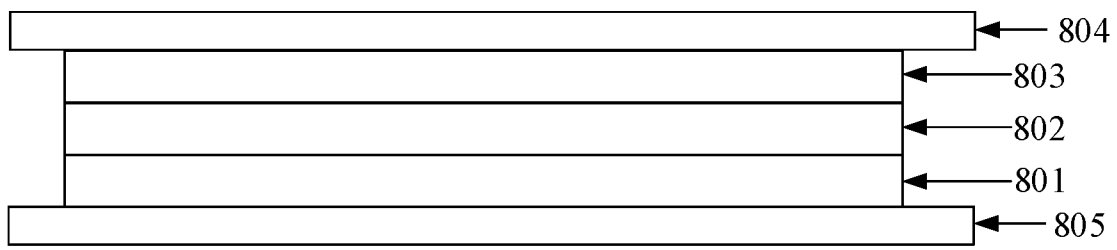
FIG. 8 is a schematic structural diagram of a back film according to an embodiment of the present disclosure.

FIG. 7 shows the back film 80 after the back film is attached to the flexible display panel 70 and the profiling jig 601 respectively. The back film may further include a protective layer, the protective layer is configured to protect the adhesive layer from the situation that the adhesive layer loses the adhesion due to dust pollution in the environment. In some embodiments, FIG. 8 is a schematic structural diagram of a back film 80 according to an embodiment of the present disclosure. The back film 80 further includes a first protective layer 804 and a second protective layer 805. The first protective layer 804 is disposed on a side, distal from the substrate layer 802, of the double-sided adhesive layer 803, the first protective layer 804 is configured to protect the double-sided adhesive layer 803. The second protective layer 805 is disposed on a side, distal from the substrate layer 802, of the adhesion-reducible adhesive layer 801, the second protective layer 805 is configured to protect the adhesion-reducible adhesive layer 801. Both the first protective layer 804 and the second protective layer 805 may be polyethylene terephthalate (PET) films or release films. Before the back film 80 is attached to the non-display surface of the flexible display panel 70, the first protective layer 804 may be removed, and the back film 80 is attached to the non-display surface of the flexible display panel 70 by the double-sided adhesive layer 803. Before the flexible display panel 70 is attached to the attaching surface F of the profiling jig 601, the second protective layer 805 may be removed, and the back film 80 is attached to the attaching surface F of the profiling jig 601 through the adhesion-reducible adhesive layer 801. Thus, the flexible display panel 70 is attached to the attaching surface F of the profiling jig 601.

In S603, the attaching surface of the profiling jig is controlled to be switched from the planar state to the profiling state, such that the attaching surface of the profiling jig drives the flexible display panel to be deformed from a planar structure to a curved-surface structure.

Figure 9:
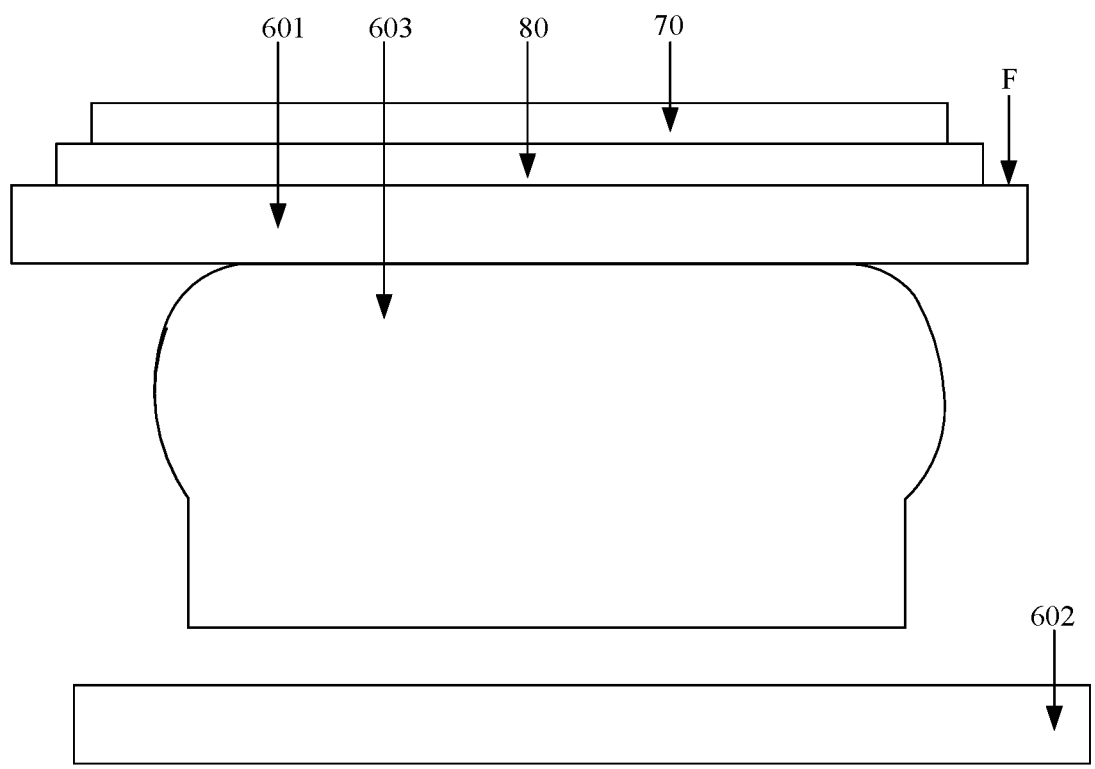
FIG. 9 is a schematic diagram of disposing a profiling jig, to which a flexible display panel is attached, on a bearing platform according to an embodiment of the present disclosure.
Figure 10:
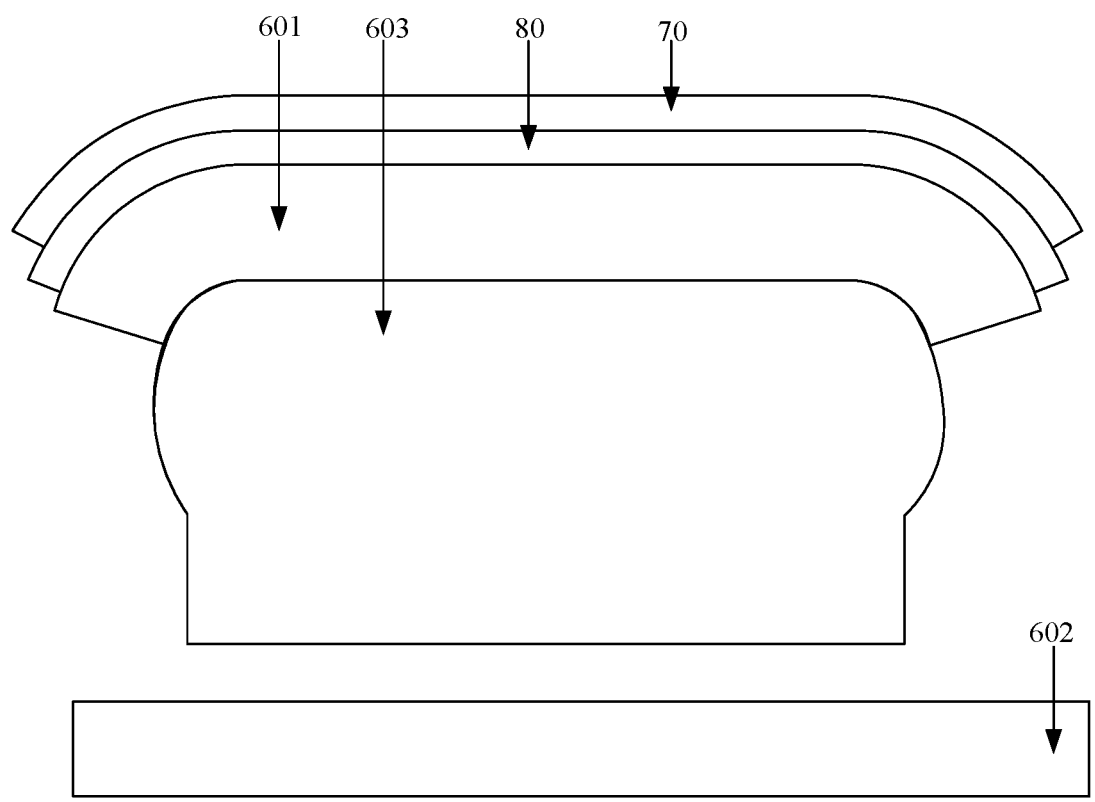
FIG. 10 is a schematic diagram of a profiled flexible display panel according to an embodiment of the present disclosure.

In some embodiments, the attaching surface F of the profiling jig 601 is controlled to be switched from the planar state to the profiling state by the acting jig 601. The profiling device 60 may further include a bearing platform 603. As shown in FIG. 9, the profiling jig 601, to which the flexible display panel 70 is attached, may be disposed on the bearing platform 603, such that the flexible display panel 70 is disposed on a side, distal from the bearing platform 603, of the profiling jig 601. Then, the profiling jig 601 is controlled to be switched from the first state (as shown in FIG. 9) to the second state (as shown in FIG. 10) by the acting jig 602. Thus, the attaching surface F of the profiling jig 601 is switched from the planar state to the profiling state. During the process that the profiling jig 601 is switched from the first state to the second state, the profiling jig 601 is deformed, and the attaching surface F of the profiling jig 601 drives the flexible display panel 70 attached to the attaching surface F to be deformed, such that the flexible display panel 70 is deformed from the planar structure to the curved-surface structure so as to achieve the profiling of the flexible display panel 70.

In one embodiment, the material of the profiling jig 601 is the thermotropic polymer, and the acting jig 602 is the heat-sensitive heating jig. The profiling jig 601 may be heated by the heat-sensitive heating jig, such that the profiling jig 601 is switched from the first state to the second state, and thus the attaching surface F of the profiling jig 601 is switched from the planar state to the profiling state and drives the flexible display panel 70 to be deformed from the planar structure to the curved-surface structure.

In another embodiment, the material of the profiling jig 601 is the electrotropic polymer, and the acting jig 602 is the inductive heating jig. The profiling jig 601 may be heated by the inductive heating jig, such that the profiling jig 601 is switched from the first state to the second state, and thus the attaching surface F of the profiling jig 601 is switched from the planar state to the profiling state and drives the flexible display panel 70 to be deformed from the planar structure to the curved-surface structure.

In still another embodiment, the material of the profiling jig 601 is the magnetotropic polymer, and the acting jig 602 is the electromagnetic jig. A magnetic field may be applied to the profiling jig 60 by the electromagnetic jig, such that the profiling jig 601 is switched from the first state to the second state, and thus the attaching surface F of the profiling jig 601 is switched from the planar state to the profiling state and drives the flexible display panel 70 to be deformed from the planar structure to the curved-surface structure.

In yet still another embodiment, the material of the profiling jig 601 is the photopolymer, and the acting jig 602 is the light-emitting jig. The profiling jig 601 may be irradiated by the light-emitting jig, such that the profiling jig 601 is switched from the first state to the second state, and thus the attaching surface F of the profiling jig 601 is switched from the planar state to the profiling state and drives the flexible display panel 70 to be deformed from the planar structure to the curved-surface structure.

After the profiling jig 601 is switched from the first state to the second state, some processing may be performed on the profiling jig 601, such that the profiling jig 601 may maintain the second state. In some embodiments, after the profiling jig 601 is switched from the first state to the second state by heating, the profiling jig 601 may be cooled at the room temperature, such that the profiling jig 601 may maintain the second first state.

In the case that the flexible display panel 70 is profiled, the adhesion of the adhesion-reducible adhesive layer 801 for adhering the flexible display panel 70 to the profiling jig 601 may be reduced, such that the adhesion of the adhesion-reducible adhesive layer 801 is reduced, and then the flexible display panel 70 is separated from the profiling jig 601. In the case that the flexible display panel 70 is separated from the profiling jig 601, the adhesion-reducible adhesive layer 801 may be separated from the profiling jig 601. In this way, the profiling jig 601 may be reused, thereby saving the cost. In addition, the process of reducing the adhesion of the adhesion-reducible adhesive layer 801 does not affect the profiling jig 601, and the state switching process of the profiling jig 601 does not affect the adhesion of the adhesion-reducible adhesive layer 801.

In the profiling method according to the embodiment of the present disclosure, since the flexible display panel 70 is attached to the attaching surface F in the case that the attaching surface F of the profiling jig 601 is in the planar state, the operation of attaching the flexible display panel 70 to the attaching surface F is simple, and the attaching yield is higher. Since the deformation of the attaching surface F of the profiling jig 601 drives the flexible display panel 70 to be deformed to profile the flexible display panel 70, and then the flexible display panel 70 is deformed from the planar structure to the three-dimensional structure, the intersection portions of the flexible display panel 70 may follow the profiling jig 601 to form a wrinkle-free curved surface, thereby achieving full profiling.

The above is the introduction to the embodiment of the profiling method of the present disclosure. A bonding system is further provided in embodiments of the present disclosure. The following introduces an embodiment of the bonding system of the present disclosure.

Figure 11:
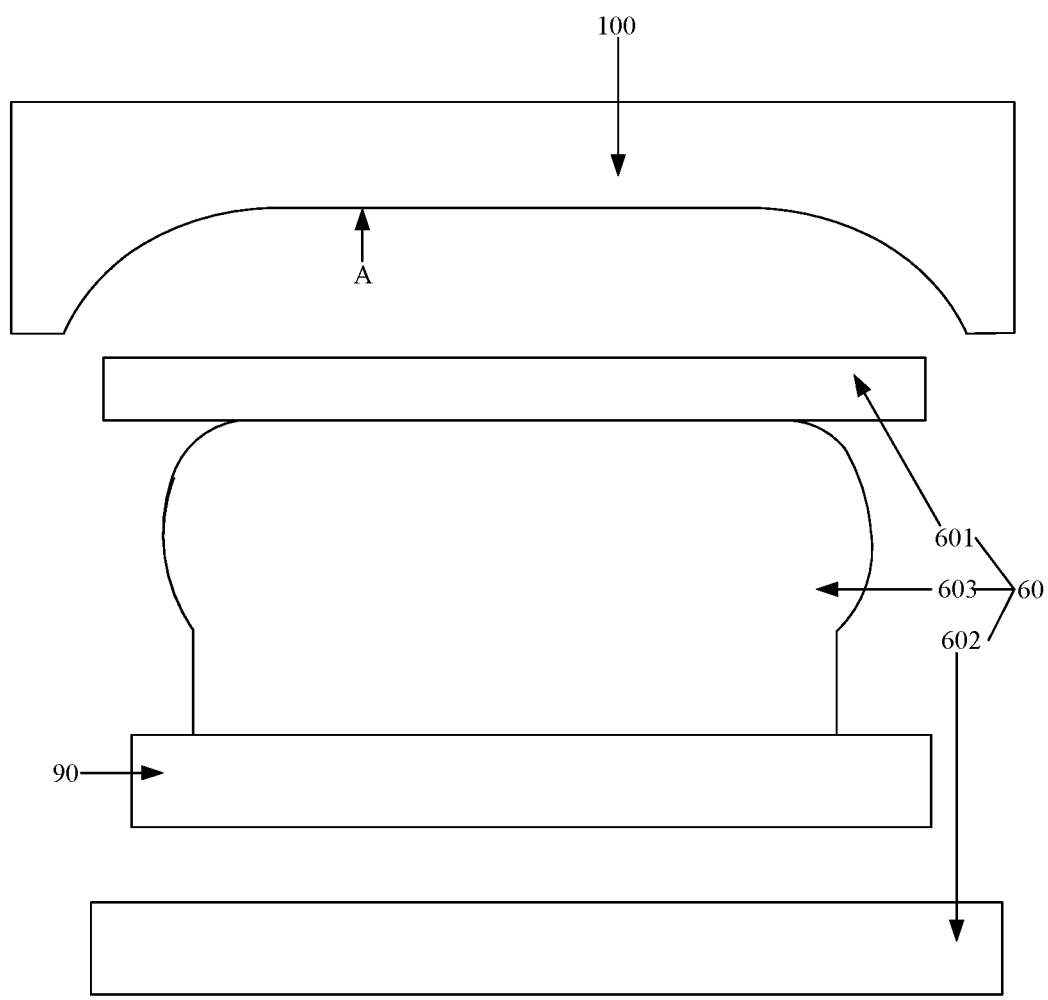
FIG. 11 is a schematic structural diagram of a bonding system according to an embodiment of the present disclosure.
Figure 12:
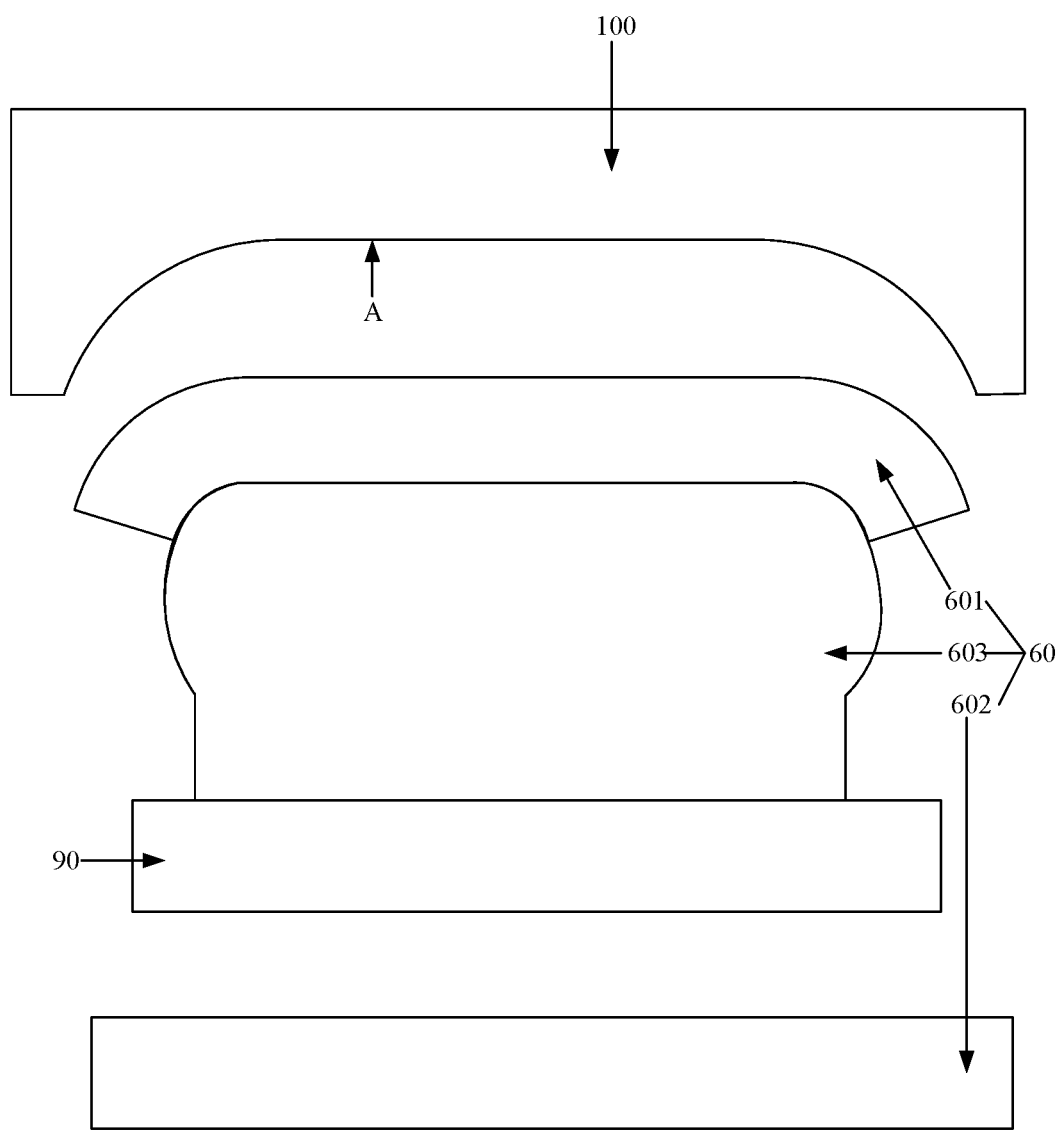
FIG. 12 is a schematic structural diagram of another bonding system according to an embodiment of the present disclosure.

FIG. 11 is a schematic structural diagram of a bonding system according to an embodiment of the present disclosure. FIG. 12 is a schematic structural diagram of another bonding system according to an embodiment of the present disclosure. The bonding system includes a driving jig 90, a cover plate jig 100 and a profiling device 60. The profiling device 60 includes a profiling jig 601. FIG. 11 shows a schematic diagram in the case that the profiling jig 601 is in a first state and FIG. 12 shows a schematic diagram in the case that the profiling jig 601 is in a second state. For the structure of the profiling device 60, reference may be made to the foregoing embodiment, which is not repeated herein.

The cover plate jig 100 is configured to bear a curved-surface cover plate. In some embodiments, the cover plate jig 100 is provided with a bearing surface A, and the structure of the bearing surface A of the cover plate jig 100 may match the structure of the curved-surface cover plate, and the curved-surface cover plate may be attached to the bearing surface A of the cover plate jig 100, such that the cover plate jig 100 bears the curved-surface cover plate.

The profiling jig 601 is configured to bear the flexible display panel. In some embodiments, the profiling jig 601 is provided with an attaching surface F, and the flexible display panel may be attached to the attaching surface F of the profiling jig 601.

The profiling device 60 is configured to profile the flexible display panel, such that the structure of the flexible display panel matches the structure of the curved-surface cover plate. For the process of profiling the flexible display panel by the profiling device 60, reference may be made to the embodiment of the profiling method described above, which is not repeated herein.

The driving jig 90 is configured to drive the profiling jig 601 and the cover plate jig 100 to approach each other, such that the flexible display panel on the profiling jig 601 is attached to the curved-surface cover plate on the cover plate jig 100. In some embodiments, the driving jig 90 is configured to drive the profiling jig 601 to move close to the cover plate jig 100.

In some embodiments, the profiling device 60 further includes a bearing platform 603, the profiling jig 601 is disposed on the bearing platform 603, and the driving jig 90 is configured to drive the bearing platform 603 to move close to the cover plate jig 100, such that the profiling jig 601 and the cover plate jig 100 approach each other.

In some embodiments, the driving jig 90 may further be configured to drive the bearing platform 603 to move away from the cover plate jig 100, such that the profiling jig 601 and the cover plate jig 100 are away from each other.

In the embodiments of the present disclosure, the description is given by taking that the driving jig 90 drives the profiling jig 601 to move to achieve that the profiling jig 601 and the cover plate jig 100 approach each other as an example. In other embodiments, the driving jig may be disposed to drive the cover plate jig 100 to move to achieve that the profiling jig 601 and the cover plate jig 100 approach each other.

The above is the introduction to the embodiment of the bonding system of the present disclosure. A bonding method is further provided in embodiments of the present disclosure. The following introduces the embodiment of the bonding method of the present disclosure.

Figure 13:
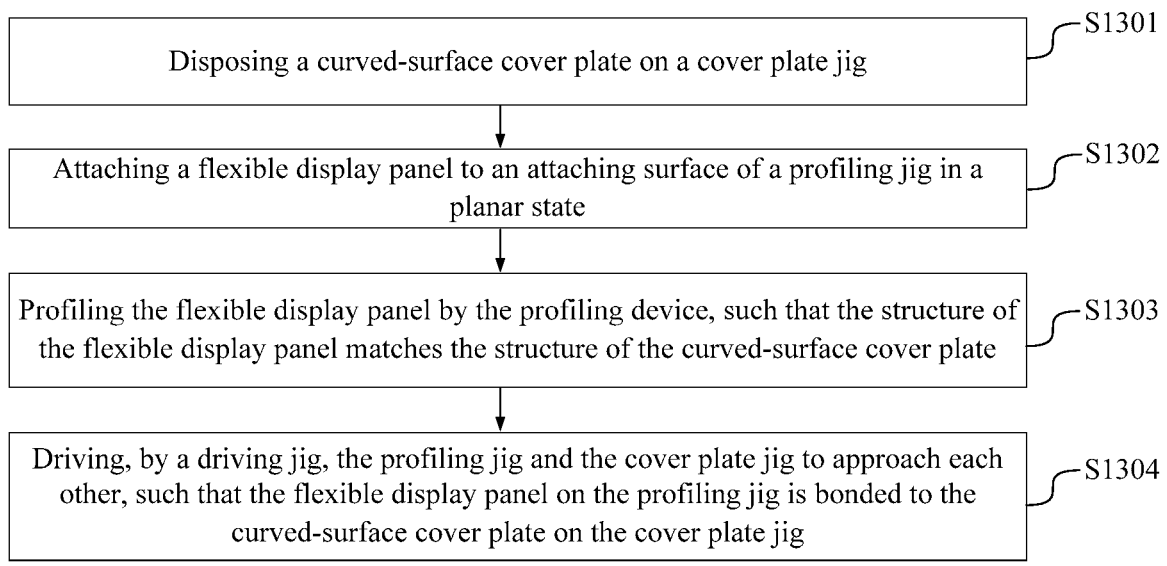
FIG. 13 is a flowchart of a bonding method according to an embodiment of the present disclosure.

FIG. 13 is a flowchart of a bonding method according to an embodiment of the present disclosure. The bonding method may be applicable to the bonding systems shown in FIG. 11 and FIG. 12. The bonding method includes the following processes.

In S1301, a curved-surface cover plate is disposed on a cover plate jig.

Figure 14:
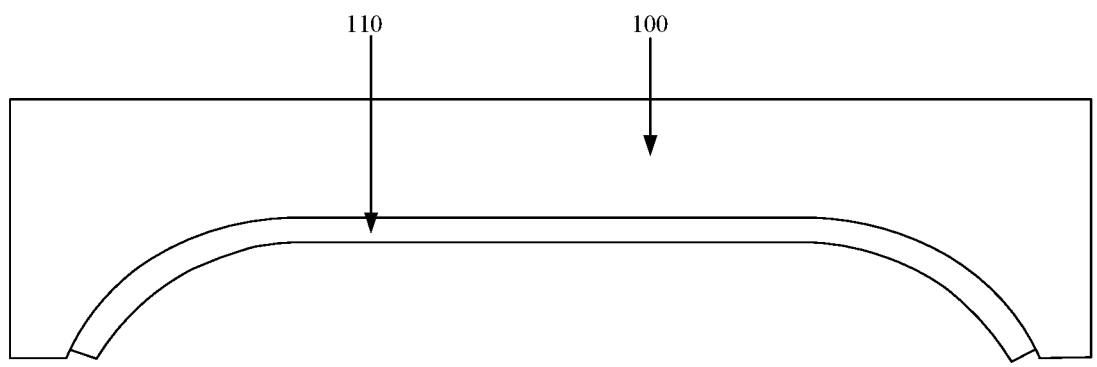
FIG. 14 is a schematic diagram of disposing a curve-surface cover plate on a cover plate jig.

FIG. 14 is a schematic diagram of disposing the curved-surface cover plate 110 on the cover plate jig 100. Referring to FIGS. 11, 12 and 14, the cover plate jig 100 is provided with a bearing surface A, and the curved-surface cover plate 110 is disposed on the bearing surface A of the cover plate jig 100. In an exemplary embodiment, the curved-surface cover plate 110 may be disposed on the bearing surface A of the cover plate jig 100 by an adhesion-reducible adhesive. Or the bearing surface A side of the cover plate jig 100 is provided with a clamping structure (not shown in FIGS. 11, 12 and 14), and the curved-surface cover plate 110 is disposed on the cover plate jig 100 by the clamping structure.

In 51302, a flexible display panel is attached to an attaching surface of a profiling jig in a planar state.

For the implementation of process 51302, reference may be made to process S602 above, which is not repeated herein.

Figure 15:
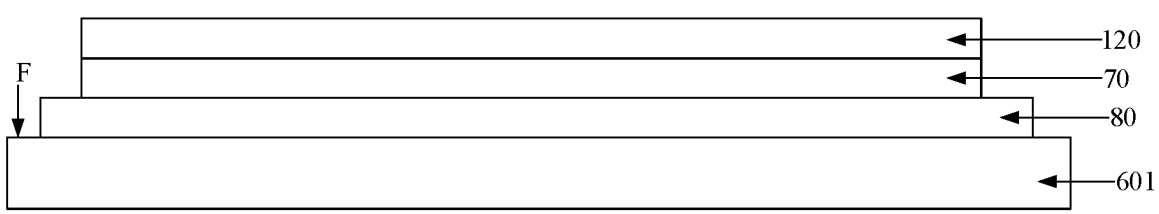
FIG. 15 is another schematic diagram of attaching a flexible display panel to a profiling jig.

As shown in FIG. 15, after the flexible display panel 70 is attached to the attaching surface F of the profiling jig 601 in the planar state, an optical adhesive layer 120 may further be formed on a surface, distal from the profiling jig 601, of the flexible display panel 70, thereby facilitating attaching the flexible display panel 70 to the curved-surface cover plate 110. The material of the optical adhesive layer 120 may be an optically clear adhesive (OCA).

In the embodiments of the present disclosure, the description is given by taking that the optical adhesive layer 120 is formed on the surface, distal from the profiling jig 601, of the flexible display panel 70 as an example. The optical adhesive layer may further be formed on a surface, distal from the cover plate jig 100, of the curved-surface cover plate 110, or optical adhesive layers are formed on the surface, distal from the profiling jig 601, of the flexible display panel 70 and the surface, distal from the cover plate jig 100, of the curved-surface cover plate 110 respectively, which is not limited in the embodiments of the present disclosure.

In S1303, the flexible display panel is profiled by the profiling device, such that the structure of the flexible display panel matches the structure of the curved-surface cover plate.

Figure 16:
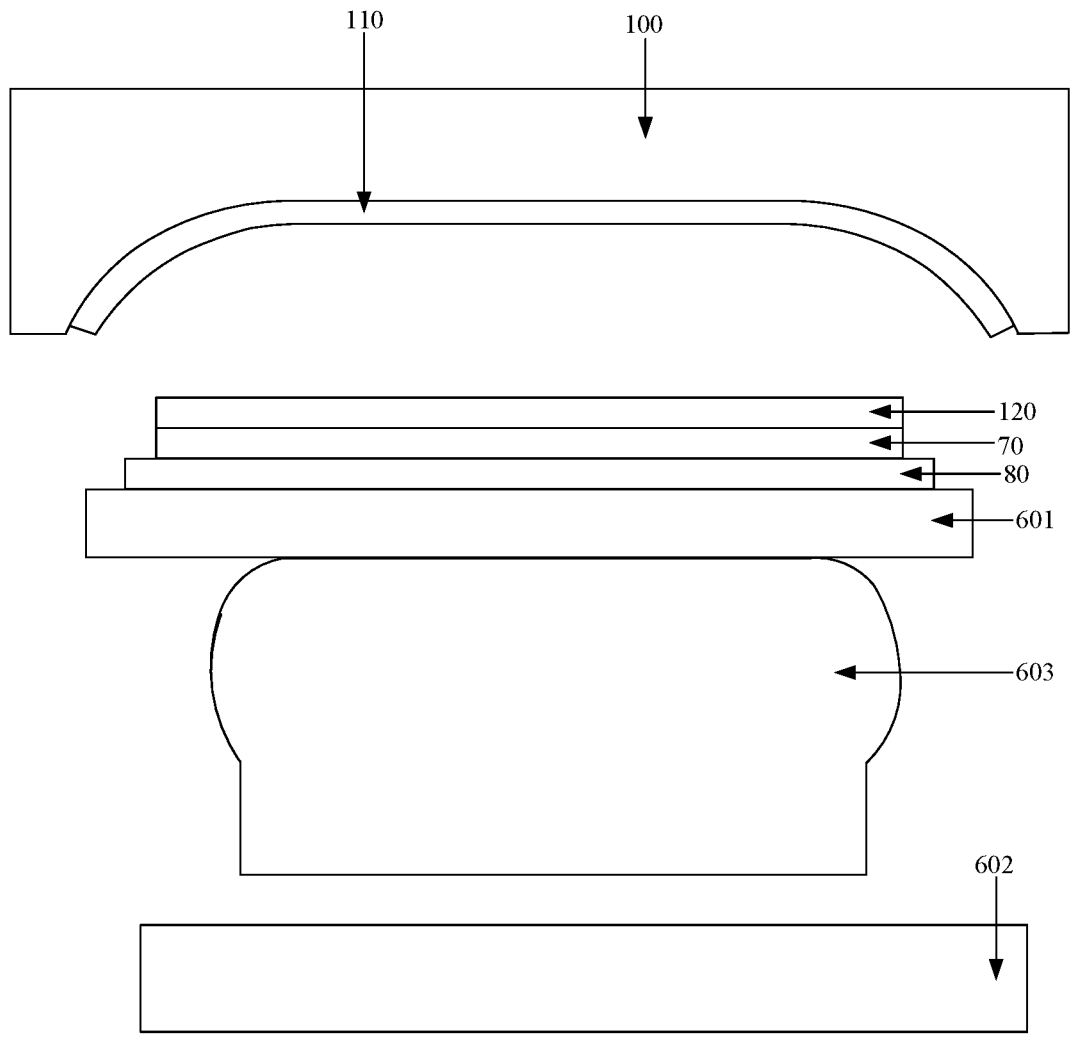
FIG. 16 is another schematic diagram of disposing a profiling jig, to which a flexible display panel is attached, on a bearing platform according to an embodiment of the present disclosure.
Figure 17:
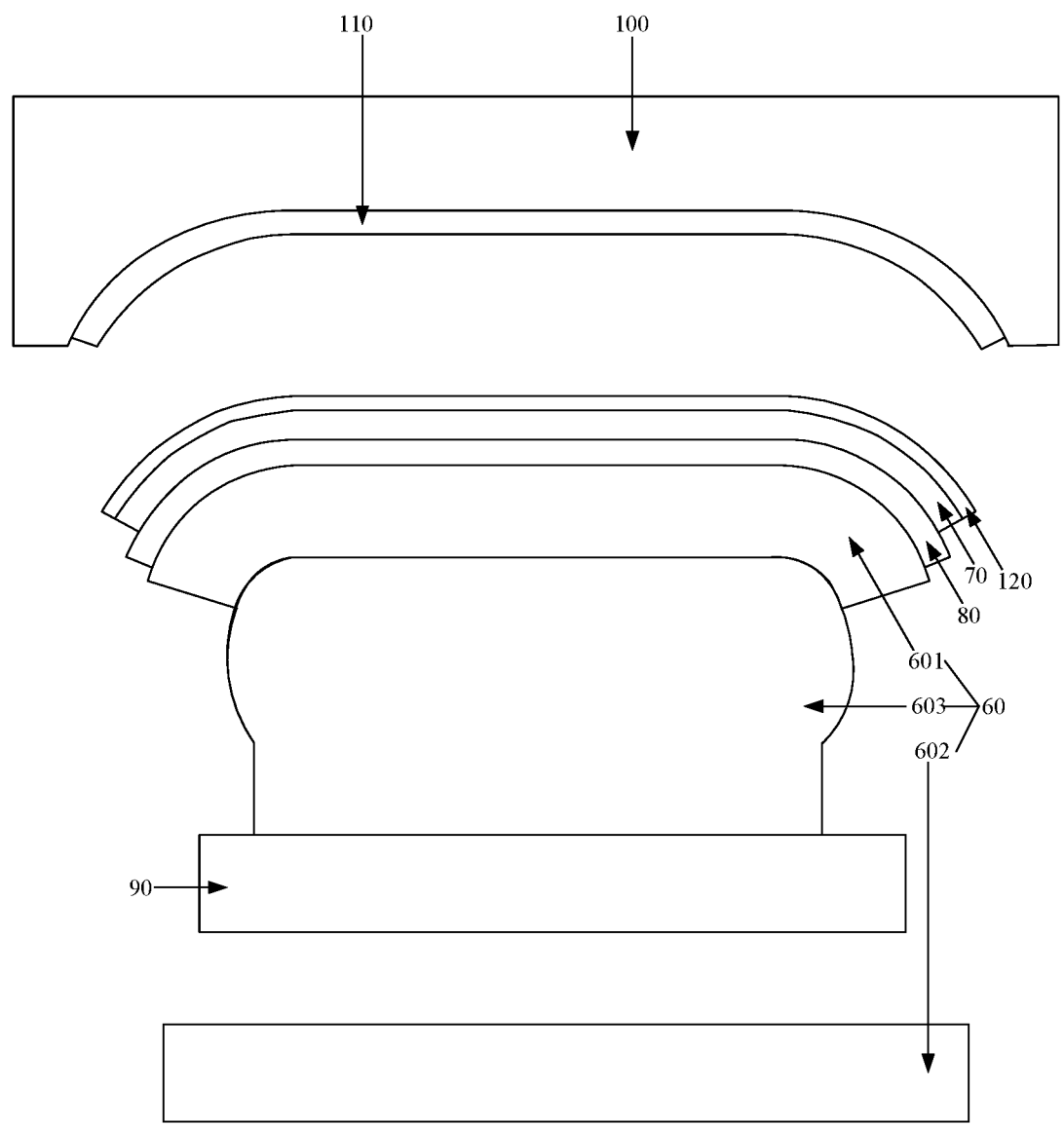
FIG. 17 is a schematic diagram of another profiled flexible display panel according to an embodiment of the present disclosure.

In an exemplary embodiment, as shown in FIG. 16, the profiling jig 601, to which the flexible display panel 70 is attached, is firstly disposed on the bearing platform 603, such that the optical adhesive layer 120 is disposed on the side, distal from the bearing platform 603, of the profiling jig 601. Then the profiling jig 601 is controlled to be switched from the first state (as shown in FIG. 16) to the second state (as shown in FIG. 17) by the acting jig 602, such that the attaching surface F of the profiling jig 601 is switched from the planar state to the profiling state. During the process that the profiling jig 601 is switched from the first state to the second state, the attaching surface F of the profiling jig 601 drives the flexible display panel 70 to be deformed, such that the flexible display panel 70 is deformed from the planar structure to the curved-surface structure to achieve the profiling of the flexible display panel. The structure of the profiled flexible display panel 70 matches the structure of the curved-surface cover plate 110, and the flexible display panel 70 may be snugly engaged to the curved-surface cover plate 110.

In S1304, the profiling jig and the cover plate jig are driven to approach each other by the driving jig, such that the flexible display panel on the profiling jig is bonded to the curved-surface cover plate on the cover plate jig.

Figure 18:
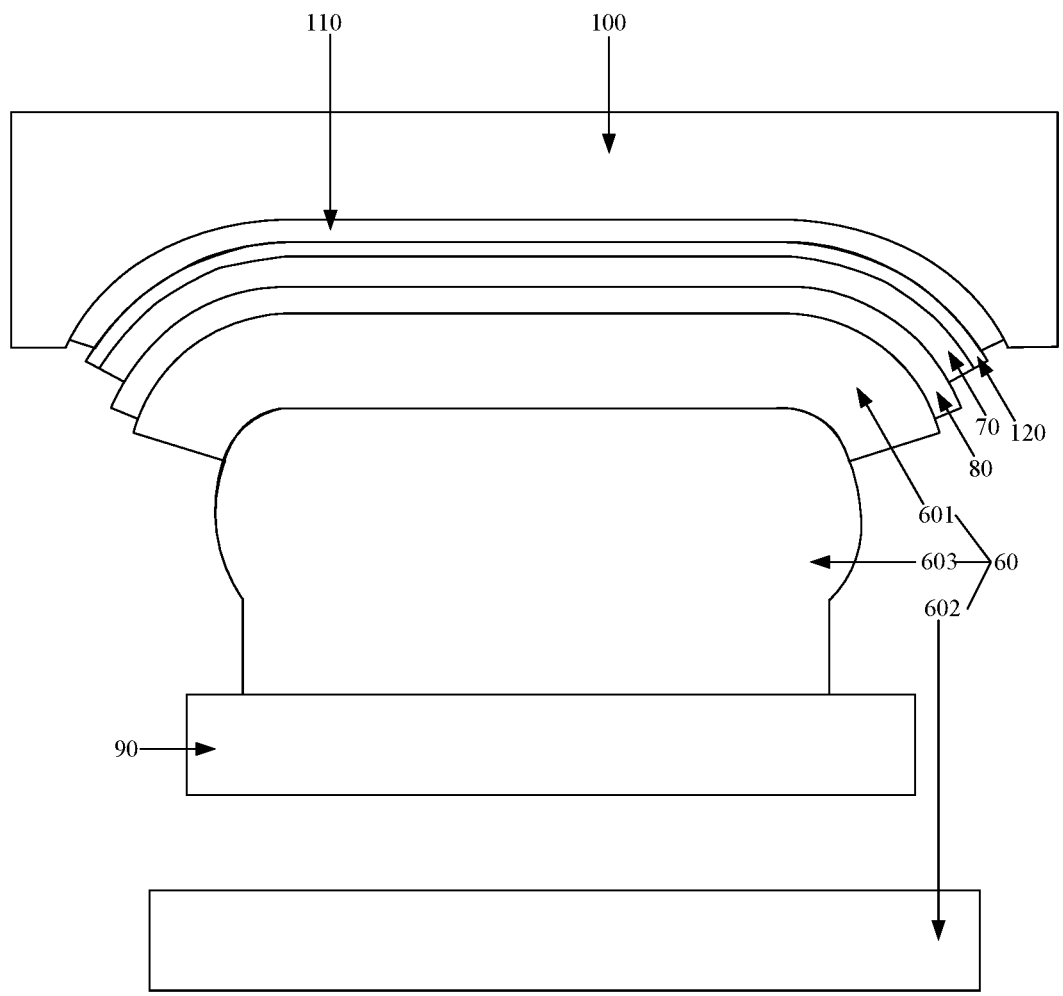
FIG. 18 is a schematic diagram after a flexible display panel is bonded to a curved-surface cover plate.

As shown in FIG. 18, the profiling jig 601 may be driven to move close to the cover plate jig 100 by the driving jig 90, such that the flexible display panel 70 on the profiling jig 601 is in contact with the curved-surface cover plate 110 on the cover plate jig 100. After the flexible display panel 70 is in contact with the curved-surface cover plate 110, a pressing force is applied to at least one of the flexible display panel 70 and the curved-surface cover plate 110 to attach the flexible display panel 70 to the curved-surface cover plate 110. In an exemplary embodiment, the profiling jig 601 is disposed on the bearing platform 603, and the driving jig 90 may drive the bearing platform 603 to move close to the cover plate jig 100, such that the profiling jig 601 on the bearing platform 603 moves close to the cover plate jig 100.

Figure 19:
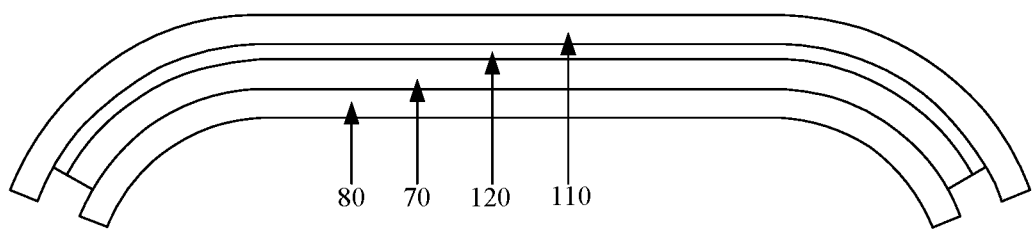
FIG. 19 is a sectional view of a display device according to an embodiment of the present disclosure.

After the flexible display panel 70 is bonded to the curved-surface cover plate 110, the flexible display panel 70 may be separated from the profiling jig 601 and the curved-surface cover plate 110 is separated from the cover plate jig 100 to acquire a display device. The display device may be as shown in FIG. 1, and a sectional view of the display device may be as shown in FIG. 19.

In an exemplary embodiment, the adhesion of an adhesion-reducible adhesive layer 801 for adhering the flexible display panel 70 to the profiling jig 601 may be reduced, such that the adhesion of the adhesion-reducible adhesive layer 801 is reduced, and then the flexible display panel 70 is separated from the profiling jig 601. In addition, the adhesion of an adhesion-reducible adhesive layer for adhering the curved-surface cover plate 110 to the cover plate jig 100 may be reduced, such that the adhesion of the adhesion-reducible adhesive layer is reduced, and then the curved-surface cover plate 110 is separated from the cover plate jig 100.

In the embodiments of the present disclosure, since the deformation of the attaching surface F of the profiling jig drives the flexible display panel to be deformed to profile the flexible display panel, the profiling accuracy of the flexible display panel is higher, the intersection region of the flexible display panel may be fully profiled to avoid the problems such as wrinkles, bubbles, and circuit breakage in the case that the flexible display panel is bonded to the curved-surface cover plate, thereby improving the bonding effect, increasing the bonding yield and improving reliability.

A display device is further provided in embodiments of the present disclosure. The display device may be the curved-surface display device as shown in FIG. 1. A sectional view of the display device may be as shown in FIG. 19.

Referring to FIG. 19, the display device includes a curved-surface cover plate 110 and a flexible display panel 70. The curved-surface cover plate 110 is bonded to the flexible display panel 70 through an optical adhesive layer 120.

In some embodiments, the display device further includes a back film 80, and the back film 80 is disposed on a side, distal from the curved-surface cover plate 110, of the flexible display panel 70. In other words, the back film 80 and the optical adhesive layer 120 are disposed on two sides of the flexible display panel 70 respectively. For the structure of the back film 80, reference may be made to FIG. 7, which is not repeated herein.

In some embodiments, the display device may be a product or component possessing a display function, such as electronic paper, a mobile phone, a tablet computer, a television, a display, a laptop computer, a digital photo frame, a navigator, a VR device, an augmented reality (AR) device, a wearable device, and the like.

In the present disclosure, orientation or positional relationships indicated by the terms "upper," "lower," "left," "right," "inner," "outer," and the like are orientation or positional relationships shown based on the accompanying drawings, only for the purpose of facilitating description, but not indicating or implying that the specified device or element has to be specifically located, and structured and operated in a specific direction, and therefore, should not be understood as limitations to the present disclosure. In addition, the terms "first," "second," "third," and "fourth" are merely for the purpose of description and should not be understood as indicating or implying relative sequence or importance.

In the present disclosure, the terms "mounted," "connected" and "connection" should be understood in a broad sense unless otherwise expressly defined and limited. In some embodiments, "connection" may be a fixed connection, a detachable connection, an integrated connection, a mechanical connection, an electrical connection, or the like. The term "connected" may be interpreted as being directly connected, or indirectly connected through an intermediate medium, or internal communication of two elements. A person of ordinary skill in the art should understand the meaning of the above terms in the embodiments of the present disclosure according to actual circumstances.

In addition, the technical features involved in different embodiments of the present disclosure described above may be combined with one another as long as they do not conflict with one another.

Heretofore, the technical solutions of the present disclosure have been described with reference to the accompanying drawings. It would be readily understood by a person skilled in the art that the protection scope of the present disclosure is obviously not limited to these embodiments. A person skilled in the art may make equivalent changes or substitutions to the relevant technical features without departing from the principle of the present disclosure, and the technical solutions after these changes or substitutions should fall within the protection scope of the present disclosure.

What is claimed is:

1. A profiling device, comprising a profiling jig; wherein the profiling jig comprises an attaching surface, and the attaching surface is configured to attach a flexible display panel and is provided with a planar state and a profiling state, wherein the attaching surface is switchable between the planar state and the profiling state, the attaching surface is a planar surface in the case that the attaching surface is in the planar state, and the attaching surface is a profiling surface in the case that the attaching surface is in the profiling state, the profiling surface comprising a profiling curved-surface; and
wherein a material of the profiling jig is a shape memory material such that the profiling jig memorizes a structure of the profiling jig in the case that the attaching surface is in the planar state and a structure of the profiling jig in the case that the attaching surface is in the profiling state.

2. The profiling device according to claim 1, wherein the shape memory material comprises any one of a shape memory alloy and a shape memory polymer.

3. The profiling device according to claim 2, wherein the shape memory polymer comprises any one of a thermotropic polymer, an electrotropic polymer, a magnetotropic polymer, and a photopolymer.

4. The profiling device according to claim 2, wherein the shape memory polymer comprises at least one of a cross-linked copolymer of stearyl acrylate and acrylic acid, polyamide, a styrene-butadiene copolymer, and polynorbornene.

5. The profiling device according to claim 1, wherein the profiling surface comprises a profiling planar surface and the profiling curved-surface, wherein the profiling curved-surface surrounds the profiling planar surface, and the profiling curved-surface continuously extends along an edge of the profiling planar surface, an edge of the profiling curved-surface being smoothly connected to the edge of the profiling planar surface.

6. The profiling device according to claim 5, wherein
the profiling curved-surface comprises a lateral profiling curved-surface and a profiling intersection surface, wherein the lateral profiling curved-surface extends along a side edge of the profiling planar surface, the profiling intersection surface is disposed between adjacent lateral profiling curved-surfaces, and the profiling intersection surface is smoothly connected to the adjacent lateral profiling curved-surfaces.

7. The profiling device according to claim 1, further comprising:
an acting jig, wherein the acting jig is configured to control the attaching surface to be switched between the planar state and the profiling state.

8. The profiling device according to claim 7, wherein the acting jig comprises any one of a heating jig, an electromagnetic jig, and a light-emitting jig.

9. The profiling device according to claim 8, wherein the heating jig comprises any one of a heat-sensitive heating jig and an inductive heating jig.

10. The profiling device according to claim 8, wherein a heating temperature of the heating jig is in a range of 40 to 70° C.

11. The profiling device according to claim 1, further comprising:
a bearing platform, wherein the bearing platform is configured to bear the profiling jig, and a bearing surface of the bearing platform matable with the profiling surface.

12. A profiling method of a flexible display panel, applicable to a profiling device;
wherein the profiling device comprises a profiling jig, the profiling jig comprises an attaching surface, and the attaching surface is configured to attach the flexible display panel and is provided with a planar state and a profiling state, wherein the attaching surface is switchable between the planar state and the profiling state, the attaching surface is a planar surface in the case that the attaching surface is in the planar state, and the attaching surface is a profiling surface in the case that the attaching surface is in the profiling state, the profiling surface comprising a profiling curved-surface; and
wherein a material of the profiling jig is a shape memory material such that the profiling jig memorizes a structure of the profiling jig in the case that the attaching surface is in the planar state and a structure of the profiling jig in the case that the attaching surface is in the profiling state;
the method comprising:
attaching the flexible display panel to the attaching surface of the profiling jig in the case that the attaching surface is in the planar state; and
controlling the attaching surface of the profiling jig to be switched from the planar state to the profiling state, such that the attaching surface of the profiling jig drives the flexible display panel to be deformed from a planar structure to a curved-surface structure.

13. The method according to claim 12, wherein
the profiling device further comprises an acting jig; and
controlling the attaching surface of the profiling jig to be switched from the planar state to the profiling state comprises: controlling the attaching surface of the profiling jig to be switched from the planar state to the profiling state by the acting jig.

14. The method according to claim 13, wherein
the acting jig is a heating jig; and
controlling the attaching surface of the profiling jig to be switched from the planar state to the profiling state comprises: heating the profiling jig by the heating jig, such that the attaching surface of the profiling jig is switched from the planar state to the profiling state.

15. The method according to claim 12, wherein
the acting jig is an electromagnetic jig; and
controlling the attaching surface of the profiling jig to be switched from the planar state to the profiling state comprises: applying a magnetic field to the profiling jig by the electromagnetic jig, such that the attaching surface of the profiling jig is switched from the planar state to the profiling state.

16. The method according to claim 12, wherein
the acting jig is a light-emitting jig; and
controlling the attaching surface of the profiling jig to be switched from the planar state to the profiling state comprises: irradiating the profiling jig by the light-emitting jig, such that the attaching surface of the profiling jig is switched from the planar state to the profiling state.

17. A bonding system, comprising a driving jig, a cover plate jig, and a profiling device; wherein
the profiling device comprises a profiling jig, the profiling jig comprising an attaching surface, and the attaching surface is configured to attach the flexible display panel and is provided with a planar state and a profiling state, the attaching surface is switchable between the planar state and the profiling state, the attaching surface is a planar surface in the case that the attaching surface is in the planar state, and the attaching surface is a profiling surface in the case that the attaching surface is in the profiling state, the profiling surface comprising a profiling curved- surface;
the cover plate jig is configured to bear a curved-surface cover plate;
the profiling jig is configured to bear a flexible display panel;
the profiling device is configured to profile the flexible display panel, such that a structure of the flexible display panel matches a structure of the curved-surface cover plate; and
the driving jig is configured to drive the profiling jig and the cover plate jig to approach each other, such that the flexible display panel on the profiling jig is bonded to the curved-surface cover plate on the cover plate jig; and
wherein a material of the profiling jig is a shape memory material such that the profiling jig memorizes a structure of the profiling jig in the case that the attaching surface is in the planar state and a structure of the profiling jig in the case that the attaching surface is in the profiling state.

\* \* \* \* \*